United States Patent

Edwards et al.

(10) Patent No.: US 9,447,693 B2
(45) Date of Patent: Sep. 20, 2016

(54) COMPLIANT ASSEMBLY

(75) Inventors: William R. Edwards, Stratham, NH (US); David P. Dube, Saco, ME (US); Richard K. Hayford, Cape Neddick, ME (US)

(73) Assignee: United Technologies Corporation, Hartford, CT (US)

( * ) Notice: Subject to any disclaimer, the term of this patent is extended or adjusted under 35 U.S.C. 154(b) by 1003 days.

(21) Appl. No.: 13/561,817

(22) Filed: Jul. 30, 2012

(65) Prior Publication Data

US 2014/0030085 A1  Jan. 30, 2014

(51) Int. Cl.

| F01D 9/04 | (2006.01) |
|---|---|
| F01D 25/06 | (2006.01) |
| F04D 29/66 | (2006.01) |
| F16F 1/36 | (2006.01) |
| F04D 29/54 | (2006.01) |
| F04D 29/64 | (2006.01) |

(52) U.S. Cl.
CPC ............... *F01D 9/042* (2013.01); *F01D 25/06* (2013.01); *F04D 29/542* (2013.01); *F04D 29/644* (2013.01); *F04D 29/668* (2013.01); *F16F 1/36* (2013.01); *F05D 2250/75* (2013.01); *F05D 2260/96* (2013.01); *F05D 2300/437* (2013.01); *Y10T 29/49245* (2015.01)

(58) Field of Classification Search
CPC ............. F01D 9/042; Y10T 29/49245; F05D 2250/75; F05D 2300/437
USPC ....... 415/119, 191, 209.3, 209.4; 291/889.22
See application file for complete search history.

(56) References Cited

U.S. PATENT DOCUMENTS

| 1,754,308 | A | | 4/1922 | Cowell et al. | |
|---|---|---|---|---|---|
| 3,356,385 | A | | 12/1967 | Small | |
| 3,778,184 | A | * | 12/1973 | Wood | 415/209.4 |
| 4,109,885 | A | | 8/1978 | Pender | |
| 4,305,696 | A | * | 12/1981 | Pask | 415/209.2 |
| 4,907,946 | A | | 3/1990 | Ciokajlo et al. | |
| 5,074,752 | A | * | 12/1991 | Murphy et al. | 415/209.4 |
| 5,238,365 | A | | 8/1993 | Petsche | |
| 5,399,069 | A | | 3/1995 | Marey et al. | |
| 5,690,469 | A | * | 11/1997 | Deal | F01D 5/005 29/889.1 |
| 5,867,867 | A | * | 2/1999 | Kessler | 16/425 |
| 6,164,903 | A | | 12/2000 | Kouris | |

(Continued)

FOREIGN PATENT DOCUMENTS

| EP | 1544415 | 6/2005 |
|---|---|---|
| EP | 1798378 | 6/2007 |

(Continued)

OTHER PUBLICATIONS

International Search Report and Written Opinion for International Application No. PCT/US2013/050415 completed on Oct. 8, 2013.

(Continued)

*Primary Examiner* — Igor Kershteyn
*Assistant Examiner* — Aaron R Eastman
(74) *Attorney, Agent, or Firm* — Carlson, Gaskey & Olds, P.C.

(57) ABSTRACT

A compliant assembly includes an airfoil and a platform section from which the airfoil extends. The platform section includes a compliant attachment that is configured to secure the platform section to another structure different than the airfoil. The compliant attachment includes a compliant material.

6 Claims, 3 Drawing Sheets

(56) References Cited

U.S. PATENT DOCUMENTS

| | | |
|---|---|---|
| 6,554,564 B1 | 4/2003 | Lord |
| 6,619,917 B2 * | 9/2003 | Glover et al. ............. 415/209.3 |
| 7,025,563 B2 | 4/2006 | Servadio et al. |
| 2004/0022625 A1 | 2/2004 | Care |
| 2006/0070782 A1 | 4/2006 | Morin et al. |
| 2009/0208332 A1 | 8/2009 | Weisntein et al. |
| 2010/0086377 A1 | 4/2010 | de Mola |

FOREIGN PATENT DOCUMENTS

| | | |
|---|---|---|
| EP | 2075414 | 7/2009 |
| EP | 2093383 | 3/2011 |
| EP | 2468434 | 6/2012 |
| GB | 2084261 | 4/1982 |
| GB | 2143278 | 2/1985 |

OTHER PUBLICATIONS

International Preliminary Report on Patentablity for International Application No. PCT/US2013/050415 mailed on Feb. 12, 2015.

European Search Report for European Patent Application No. EP13825659 completed Aug. 26, 2015.

* cited by examiner

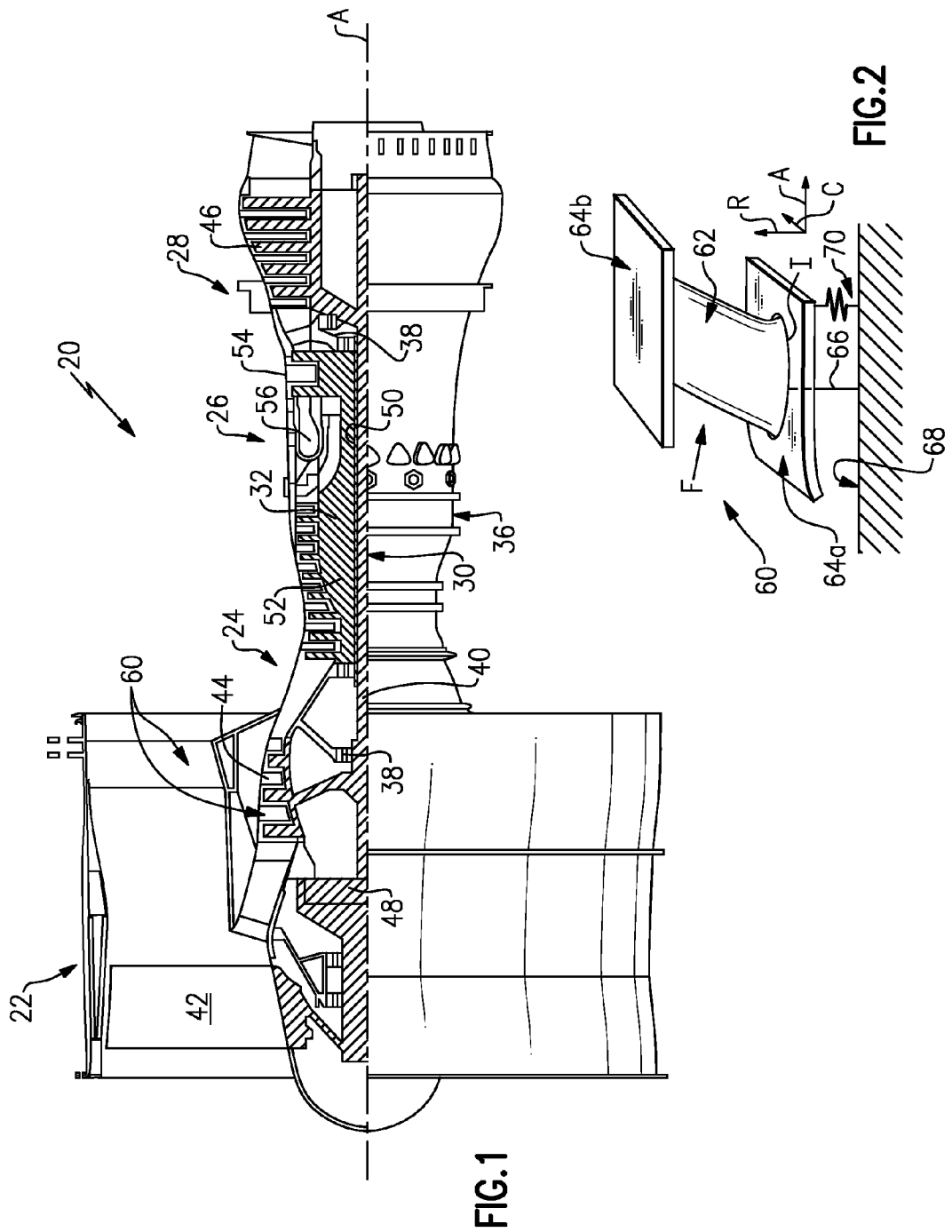

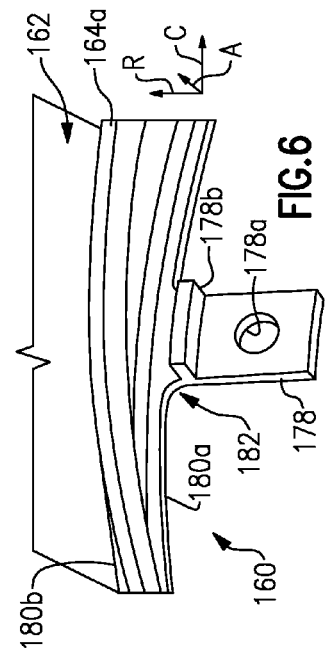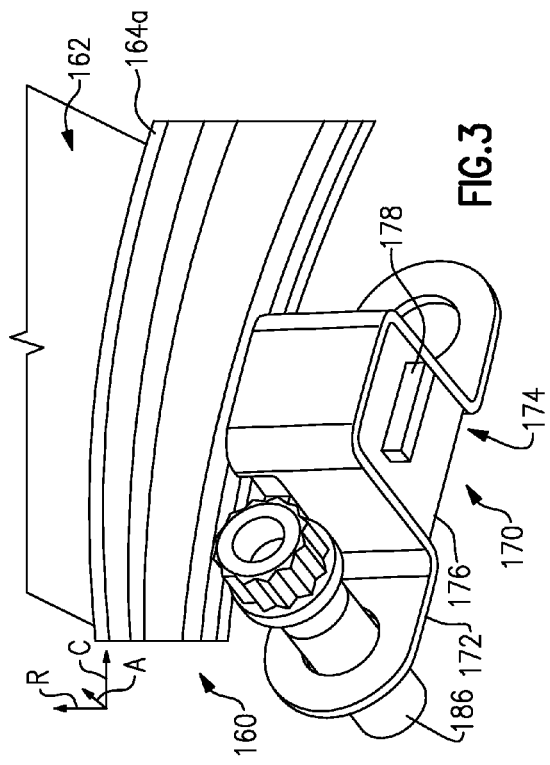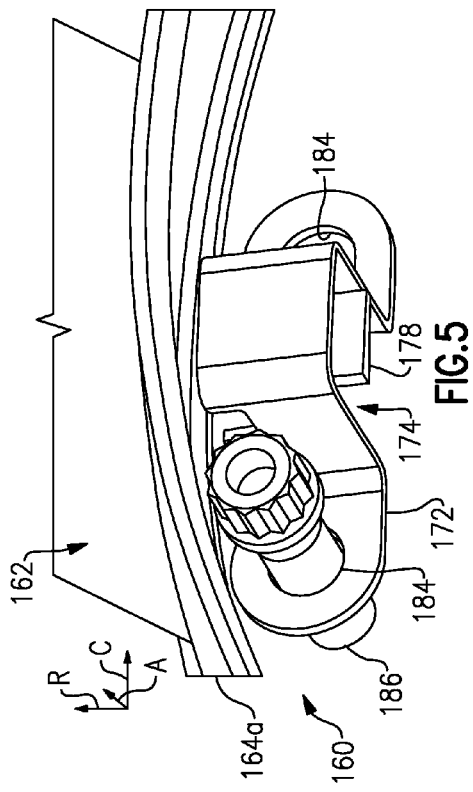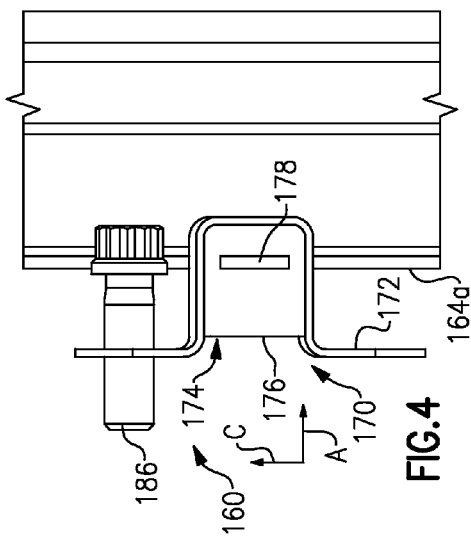

COMPLIANT ASSEMBLY

BACKGROUND

This disclosure relates to a compliant attachment that may be used to compliantly restrain movement of one component relative to another component.

In gas turbine engines, stator vane assemblies are typically fixed at one end to a support structure and ganged together at another end to neighboring vane assemblies. In use, the stator vane assemblies are subject to thermal expansion and contraction as well as engine vibrations.

SUMMARY

A compliant assembly according to an exemplary aspect of the present disclosure includes an airfoil and a platform section from which the airfoil extends. The platform section includes a compliant attachment configured to secure the platform section to another structure different than the airfoil. The compliant attachment includes a compliant material.

In a further non-limiting embodiment, the compliant attachment includes a bracket defining a cavity therein, the compliant material being disposed in the cavity, and a tab extending into the cavity such that a portion of the tab is embedded in the compliant material.

In a further non-limiting embodiment of any of the foregoing examples, the bracket is U-shaped.

In a further non-limiting embodiment of any of the foregoing examples, the tab includes an opening there through.

In a further non-limiting embodiment of any of the foregoing examples, the compliant material extends through the opening.

In a further non-limiting embodiment of any of the foregoing examples, the tab includes a protrusion extending therefrom that is located outside of the cavity of the bracket and spaced apart from the bracket.

In a further non-limiting embodiment of any of the foregoing examples, the tab is located on a first side of the platform section and the airfoil extends substantially from a second, opposite side of the platform section.

In a further non-limiting embodiment of any of the foregoing examples, the compliant material is a non-metal.

In a further non-limiting embodiment of any of the foregoing examples, the compliant material includes silicone.

A method for attaching an assembly according to an exemplary aspect of the present disclosure includes providing an assembly including an airfoil and a platform section from which the airfoil extends and compliantly restraining movement of the platform section relative to another structure different than the airfoil.

A further non-limiting embodiment includes compliantly restraining at least one of thermal expansion movement of the platform section and vibratory movement of the platform section.

A further non-limiting embodiment of any of the foregoing examples includes using a compliant attachment configured to secure the platform section to another structure different than the airfoil to compliantly restrain the movement of the platform section.

A compliant assembly according to an exemplary aspect of the present disclosure includes a bracket defining a cavity therein, a compliant material disposed within the cavity, and a tab extending into the cavity such that a portion of the tab is embedded in the compliant material.

In a further non-limiting embodiment of any of the foregoing examples, the bracket is U-shaped.

In a further non-limiting embodiment of any of the foregoing examples, the tab includes an opening there through.

In a further non-limiting embodiment of any of the foregoing examples, the tab includes a protrusion extending there from that is located outside of the cavity of the bracket and is spaced apart from the bracket.

In a further non-limiting embodiment of any of the foregoing examples, the compliant material is a non-metal.

In a further non-limiting embodiment of any of the foregoing examples, the compliant material includes silicone.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 shows an example gas turbine engine.

FIG. 2 shows an example airfoil assembly including a compliant attachment.

FIG. 3 shows another example airfoil assembly having a compliant attachment.

FIG. 4 shows another view of the airfoil assembly and compliant attachment of FIG. 3.

FIG. 5 shows the airfoil assembly and compliant attachment of FIG. 3 without a compliant material of the compliant attachment.

FIG. 6 shows the platform section and tab without the bracket and compliant material as in FIG. 3.

DETAILED DESCRIPTION

Figure 7:
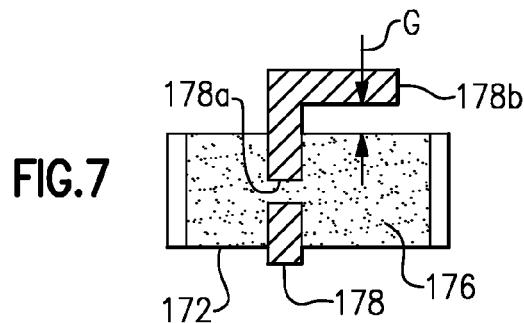
FIG. 7 shows a view of a tab having a protrusion spaced apart from a bracket.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans and the teachings herein may be applied to other types of turbine engines, including single spool and three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

As can be appreciated, the gas turbine engine 20 includes airfoil assemblies 60, such as, but not limited to, low pressure compressor stator vane assemblies and structural guide assemblies. FIG. 2 shows an example of one of the airfoil assemblies 60. In this example, the airfoil assembly 60 is a stator vane assembly that may be used in the compressor section 24 of the gas turbine engine 20, but the example can also be applied to other airfoil assemblies, other engine structures or even non-engine structures.

The airfoil assembly 60 includes an airfoil 62 and a platform section 64a from which the airfoil 62 extends. An "airfoil" is a structure that has a wing-like shape that provides a reaction force via Bernoulli's principle with regard to air flow over the airfoil. In this example, the airfoil assembly 60 also includes another platform section 64b at an opposing end of the airfoil 62. Depending on the particular type of airfoil assembly 60, the airfoil assembly 60 may have only a single platform section.

As can be appreciated, a plurality of such airfoil assemblies 60 can be arranged circumferentially around the engine central axis A to define a gas flow path F between the platform sections 64a/64b. The airfoil 62 of the airfoil assembly 60 may be rigidly attached at 66 to a structural component 68, such as an engine housing or cowl. The platform section 64a is attached to the airfoil 62 at interface I in a known manner. Depending upon the design of the given engine, the rigid attachment 66 may be either at a radially inner or radially outer end of the airfoil assembly 60 with regard to the engine central axis A.

The platform section 64a in this example includes a compliant attachment 70 (assembly shown schematically) that is configured to secure the platform section 64a to the structural component 68. Again, depending upon the design of the given engine, it is to be understood that the compliant attachment 70 may be located at the radially inner end or radially outer end of the airfoil assembly 60, or at both ends, with regard to the engine central axis A.

As will be described in further detail below, the compliant attachment 70 permits the platform section 64a to move in any or all of an axial direction along central axis A, a radial direction R and a circumferential direction C (three degrees of freedom) but can permit a relatively greater or lesser degree of movement in any of the directions. The compliant attachment 70 compliantly restrains movement of the platform section 64a relative to the structural component 68. The compliant attachment 70 thus facilitates securing the platform section 64a to the structural component 68, yet allows limited movement from thermal expansion, vibrations or the like to facilitate the reduction of stress on the airfoil assembly 60.

Referring to FIGS. 3-6, selected portions of another example airfoil assembly 160 are shown. In this disclosure, like reference numerals designate like elements where appropriate and the reference numerals with the addition of one-hundred or multiples thereof designate modified elements that are understood to incorporate the same features and benefits of the corresponding elements. In this example, the compliant attachment 170 includes a bracket 172 that defines a cavity 174 therein. A compliant material 176 is arranged within the cavity 174. A tab 178 extends into the cavity 174 and a portion of the tab is embedded within the compliant material 176.

In one example, the compliant material 176 is a non-metal material. In a further example, the non-metal material has a composition that includes greater than 50% by weight of non-metallic material. For example, the non-metallic material is a polymeric material, such as silicone or other elastomer. Further, the composition of the compliant material 176 may be selected to provide properties that achieve a desired amount of compliance. For instance, the hardness of the compliant material 176 may be selected based upon design factors of the airfoil assembly 160 with regard to thermal expansion/contraction and/or vibrations such that resulting stresses on the airfoil assembly 160 are reduced in comparison to a similar airfoil assembly that uses a rigid attachment instead of the compliant attachment 170. Additionally, the compliant material 176 galvanically and thermally isolates the tab 178 and platform section 164a from the bracket 172 and structural component 68, thus reducing corrosion effects and temperature increases from thermal conductance and eliminating the need for galvanic coating (which may add cost).

As shown in FIG. 6, the tab 178 extends from the platform section 164a in this example. The tab 178 is located on a first side 180a of the platform section 164a, which is opposite from another side 180b from which the airfoil 162 extends. A portion of the airfoil 162 may in fact extend through the platform section 164a for rigid attachment to the structural component 68. However, a majority of the length of the airfoil 162 is located on side 180b.

In this example, the tab 178 includes an opening 178a there through and a protrusion 178b that extends from a base 182 where the tab 178 connects to the platform section 164a. The compliant material 176 extends through the opening 178a and facilitates the embedding and securing of the tab 178a within the compliant material 176. The protrusion 178b projects adjacent the bracket 172 but is spaced there from. As will be described in further detail below, the protrusion 178b acts as a stop to limit excessive movement of the tab 178, and thus the platform section 164a, relative to the bracket 172, which is rigidly secured to the structural component 68.

In this example, the bracket 172 is generally U-shaped and includes openings 184 on each side of the cavity 174 for receiving fasteners 186 (one shown) there through to rigidly secure the bracket 172 to the structural component 68.

As can be appreciated, the compliant attachment 170 can alternatively be inversely arranged with regard to the bracket 172 and the tab 178 such that the tab 178 would be secured to the structural component 68 using fasteners and the bracket 172 would be coupled on the platform section 164a.

The compliant material 176 compliantly restrains movement of the tab 178 and thus also of the platform section 164a relative to the bracket 172 and structural component 68 to which the bracket 172 is secured. For example, the platform section 164a may thermally expand/contract during use and/or vibrate during use such that the platform section 164a and tab 178 have the tendency to move along at least one of the axial, circumferential or radial directions. Since the tab 178 is partially embedded in the compliant material 176, the compliant material 176 and rigidly secured bracket 172 cooperate to restrict movement along any of those directions.

As an example, the platform section 164a and tab 178 can move axially or circumferentially by compressing the compliant material 176 in the axial or circumferential direction. Since the compliant material 176 is relatively soft and pliable in comparison to the metal material that may be used for the bracket 172, the tab 178 and the platform section 164a, the compliant material 176 relatively easily compresses to permit such movement. However, with increasing amounts of compression, the compliant material 176 provides increased resistance to further movement and thus limits further movement of the tab 178 and the platform section 164a in the axial and circumferential directions. That is, there is a finite amount of compliant material 176 between the sides of the tab 178 and the sides of the bracket 172 forming the cavity 174. Thus, although the compliant material 176 allows some movement to accommodate thermal expansion/contraction or vibrations, gross movement of the tab 178 and platform section 164 is limited. The compliant material 176 in the opening 178a of the tab 178 also provides shear resistance to movement in the circumferential direction C in this example. Further, should the compliant material 176 fail, the tab 178 is captured in the cavity 174 of the bracket 172 to limit gross movement of the tab 178 and platform section 164a.

Additionally, since the bracket 172 does not include walls on the radially inner and outer sides of the compliant material 176 (see FIG. 3) to react radially directed forces, the compliant material 176 does not provide as much resistance to movement of the tab 178 and platform section 164a in the radial direction. Thus, the tab 178 and platform section 164a are permitted greater freedom of movement in the radial direction than in the axial or circumferential directions to accommodate thermal and/or vibratory movement. In the airfoil assembly 60, thermal expansion and contraction may be pronounced in the radial direction and thus the greater degree of freedom to move in the radial direction facilitates the reduction of thermally induced stresses in such assemblies. In other components, more or less movement may be provided in other directions as desired based on the teachings herein.

The protrusion 178b on the tab 178 further limits excessive movement of the tab 178 and the platform section 164a. For example, as shown in FIG. 7, if the tab 178 and platform section 164a (not shown) move in an amount equal to the size of a gap G between the protrusion 178b and the bracket 172, the protrusion 178b acts as a stop to limit or prevent further movement of the tab 178 and platform section 164a.

The compliant assembly 170 can be produced by providing the bracket 172, arranging the platform section 164a such that the tab 178 extends into a proper defined position in the cavity 174, and then depositing the compliant material 176, or a resin precursor thereof, in the cavity 174 such that the compliant material 176 or resin precursor embeds a portion of the tab 178 in the cavity and extends through the opening 178a (if used) of the tab 178. In one example, a resin precursor is injection or compression molded into the cavity 174. The end of the tab 178 may extend outwards from the compliant material 176 (see FIG. 3) to facilitate holding or positioning of the tab 178 during processing. Depending on the composition of the selected compliant material 176, the compliant material 176 or resin precursor may then be cured to form the final compliant material 176.

Figure 8:
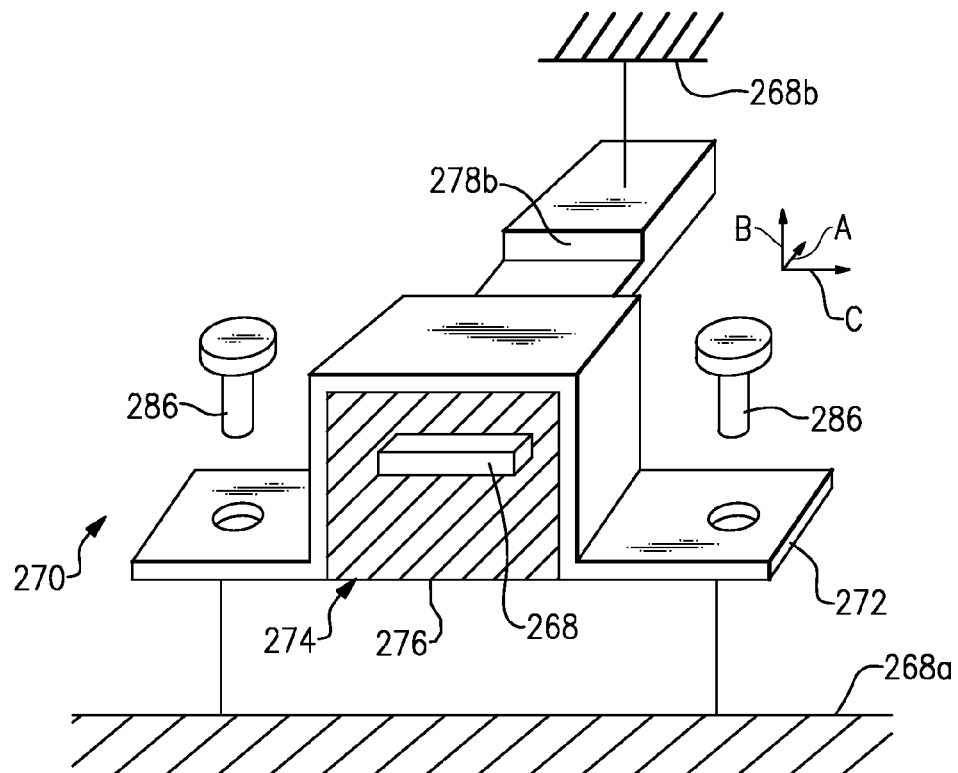
FIG. 8 shows another example compliant attachment that is connected between two components.
Figure 9:
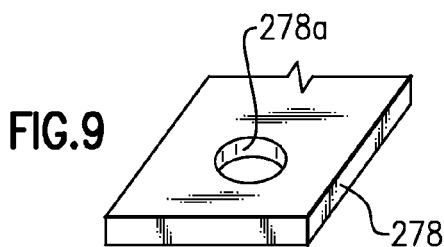
FIG. 9 shows a portion of the tab of the compliant attachment of FIG. 7.

Referring to FIGS. 8 and 9, another example compliant attachment 270 is shown. As can be appreciated, the compliant attachment 270 can be used to compliantly restrain any two components relative to each other. In this example, the tab 178 is rigidly secured to a component 268b and the bracket 272 is rigidly secured by the fasteners 286 to component 268a. Thus, the compliant attachment 270 is not limited to use in airfoil assemblies and it is to be understood that the compliant assembly 270 can be used in other applications that would benefit therefrom.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A compliant assembly comprising:
a bracket defining a cavity therein,
a compliant material disposed within the cavity; and
a tab extending into the cavity such that a portion of the tab is embedded in the compliant material, the tab including a tab base located outside of the cavity and a protrusion transversely extending from the tab base and that is also located outside of the cavity such that the protrusion is spaced apart from the bracket, the protrusion having a free tip adjacent the bracket such that the protrusion limits relative movement between the tab and the bracket upon compression of the compliant material to close the space between the bracket and the protrusion.

2. The compliant assembly as recited in claim 1, wherein the bracket is U-shaped.

3. The compliant assembly as recited in claim 1, wherein the tab includes an opening there through.

4. The compliant assembly as recited in claim 1, wherein the compliant material is a non-metal.

5. The compliant assembly as recited in claim 1, wherein the compliant material includes silicone.

6. The compliant assembly as recited in claim 1, wherein the protrusion limits relative movement between the tab and the bracket along a longitudinal direction of the tab.

* * * * *